(12) United States Patent
Bliss (10) Patent No.: US 11,840,409 B2
(45) Date of Patent: Dec. 12, 2023

(54) PNEUMATIC DELIVERY SYSTEM AND METHOD OF USING THE SAME

(71) Applicant: Derrick Bliss, Floral Park, NY (US)

(72) Inventor: Derrick Bliss, Floral Park, NY (US)

( * ) Notice: Subject to any disclaimer, the term of this patent is extended or adjusted under 35 U.S.C. 154(b) by 0 days.

(21) Appl. No.: 17/495,240

(22) Filed: Oct. 6, 2021

(65) Prior Publication Data
US 2022/0106132 A1    Apr. 7, 2022

Related U.S. Application Data

(60) Provisional application No. 63/088,244, filed on Oct. 6, 2020.

(51) Int. Cl.
*B65G 51/46* (2006.01)
*B65G 51/38* (2006.01)

(52) U.S. Cl.
CPC ............ *B65G 51/46* (2013.01); *B65G 51/38* (2013.01)

(58) Field of Classification Search
CPC ...................................................... B65G 51/38
See application file for complete search history.

(56) References Cited

U.S. PATENT DOCUMENTS

| | | | | |
|---|---|---|---|---|
| 1,797,864 A * | 3/1931 | Harlandt | B65G 51/42 | 186/20 |
| 2,472,857 A * | 6/1949 | Mcclure | B65G 51/38 | 406/35 |
| 3,266,751 A * | 8/1966 | Purdy | B65G 51/06 | 292/256.65 |
| 3,490,717 A * | 1/1970 | Rejler | B65G 51/04 | 406/176 |
| 3,556,604 A * | 1/1971 | Round | B65G 51/04 | 406/10 |
| 3,711,038 A * | 1/1973 | Van Otteren | B65G 51/04 | 406/84 |
| 3,838,634 A * | 10/1974 | Alexandrov | B30B 9/3007 | 425/149 |
| 3,986,590 A * | 10/1976 | Lapidus | B65G 51/04 | 193/32 |
| 4,058,274 A * | 11/1977 | Hochradel | B65G 51/40 | 406/2 |
| 4,076,321 A * | 2/1978 | Haight | B65F 5/005 | 406/117 |
| 4,135,685 A * | 1/1979 | Girshovich | B65G 51/20 | 406/84 |
| 4,275,976 A * | 6/1981 | Sticht | B65G 51/38 | 406/28 |
| 4,529,335 A * | 7/1985 | Hilbert | B65G 51/32 | 406/182 |

(Continued)

*Primary Examiner* — Joseph A Dillon, Jr.
(74) *Attorney, Agent, or Firm* — SHORE IP GROUP, PLLC; Sean R. Wilsusen, Esq.

(57) ABSTRACT

A pneumatic delivery system includes a capsule. The capsule includes a package receptacle. A pneumatic tube includes a plurality of entry ports and a plurality of exit ports. The plurality of entry ports are configured to receive the capsule for transport. The plurality of exit ports are configured to remove the capsule from the pneumatic tube. At least one of the exit ports is located in a personal residence. A compressed air pump is configured to advance the capsule through the pneumatic tube. A capsule location system is configured to determine a location of the capsule with respect to the pneumatic tube.

13 Claims, 6 Drawing Sheets

(56) References Cited

U.S. PATENT DOCUMENTS

| | | | | |
|---|---|---|---|---|
| 4,941,777 | A * | 7/1990 | Kieronski | B65G 1/06 406/176 |
| 5,174,689 | A * | 12/1992 | Kondolf, Jr. | B65G 51/26 406/176 |
| 5,215,412 | A * | 6/1993 | Rogoff | B65G 51/34 406/176 |
| 5,294,154 | A * | 3/1994 | Le Devehat | B67D 7/78 285/31 |
| 5,299,891 | A * | 4/1994 | Grosswiller | B65G 51/34 406/84 |
| 5,573,356 | A * | 11/1996 | Henderson | B65G 51/06 406/186 |
| 5,864,485 | A * | 1/1999 | Hawthorne | B65G 51/36 700/229 |
| 6,322,295 | B1 * | 11/2001 | Gabriele | B65G 51/02 406/84 |
| 6,592,302 | B2 * | 7/2003 | Balko | B65G 51/34 417/315 |
| 6,711,463 | B2 * | 3/2004 | Tozuka | B64F 1/366 700/226 |
| 6,712,561 | B1 * | 3/2004 | Valerino, Sr. | A61B 50/362 406/197 |
| 7,260,447 | B2 * | 8/2007 | Osborne | B01F 31/20 700/231 |
| 7,260,449 | B2 * | 8/2007 | Zimmermann | B65G 54/00 700/229 |
| 9,352,914 | B2 * | 5/2016 | Le | B65G 51/32 |
| 9,533,300 | B2 * | 1/2017 | Richter | G01N 35/04 |
| 9,540,187 | B2 * | 1/2017 | Valerino, Sr. | B65G 51/04 |
| 9,630,787 | B2 * | 4/2017 | Valerino, Sr. | B65G 51/04 |
| 9,656,815 | B2 * | 5/2017 | Hoganson | B65G 51/36 |
| 9,969,568 | B2 * | 5/2018 | Nguyen | B65G 51/24 |
| 10,023,402 | B2 * | 7/2018 | Hoganson | B65G 51/44 |
| 10,099,868 | B1 * | 10/2018 | Da Costa | B65G 51/32 |
| 10,373,710 | B2 * | 8/2019 | Valerino | G06Q 10/0833 |
| 11,059,681 | B2 * | 7/2021 | Lathan | H04W 88/085 |
| 11,390,470 | B1 * | 7/2022 | Cooley | B65G 51/08 |
| 11,406,211 | B2 * | 8/2022 | Pate | A47G 29/1225 |
| 2004/0176872 | A1 * | 9/2004 | Eidemiller | B65G 47/50 198/465.4 |
| 2004/0223660 | A1 * | 11/2004 | Zank | G08B 13/1427 382/277 |
| 2007/0285240 | A1 * | 12/2007 | Sensenig | G08B 13/2462 705/28 |
| 2011/0052351 | A1 * | 3/2011 | Voelker | B65G 51/06 70/91 |
| 2011/0282591 | A1 * | 11/2011 | Cogen | G01M 3/005 73/504.08 |
| 2014/0214198 | A1 * | 7/2014 | Depietro | G07F 19/205 700/231 |
| 2016/0170391 | A1 * | 6/2016 | Hoopes | G05B 19/041 700/112 |
| 2019/0183737 | A1 * | 6/2019 | Valerino, Sr. | B65G 51/26 |
| 2022/0234843 | A1 * | 7/2022 | Cumby Beeks | B65G 51/28 |

\* cited by examiner

PNEUMATIC DELIVERY SYSTEM AND METHOD OF USING THE SAME

CROSS-REFERENCE TO RELATED APPLICATION

This application claims the benefit of and priority to U.S. Provisional Application No. 63/088,244, filed Oct. 6, 2020. The entire contents of the foregoing application is incorporated by reference herein.

BACKGROUND

Technical Field

This disclosure relates to pneumatic delivery systems and methods of using pneumatic delivery systems and, more particularly, to pneumatic delivery systems and methods of using pneumatic delivery systems to transport a capsule.

Discussion of Related Art

Consumers are increasingly having packages delivered to residential locations. Many such packages are left at the delivery site without a signature of the intended package recipient. Thus, an intended package recipient may be unable to take possession of and secure a delivered package upon delivery of the package. As a result, theft of the delivered package or damage to the delivered package may occur prior to the intended recipient taking possession of the delivered package.

Packages may be safely transported directly from a commercial facility to a personal residence through a tube. Many packages sent through common carriers get lost in the everyday system of package transport from manufacturing to shipping centers. The packages may be tracked throughout tube transport and enable safe and rapid possession of the delivered package, and decrease the likelihood of lost or misplaced packages.

Thus, tube transport may secure safe and rapid possession of the delivered package from a commercial facility to a personal residence.

SUMMARY

In accordance with an aspect of the disclosure, a pneumatic delivery system includes a capsule. The capsule includes a package receptacle. A pneumatic tube includes a plurality of entry ports and a plurality of exit ports. The plurality of entry ports are configured to receive the capsule for transport. The plurality of exit ports are configured to remove the capsule from the pneumatic tube. At least one of the exit ports is located in a personal residence. A compressed air pump is configured to advance the capsule through the pneumatic tube. A capsule location system is configured to determine a location of the capsule with respect to the pneumatic tube.

In some respects, the capsule is waterproof. The capsule may include carbon fiber or plastic. Further, the capsule may include Polyvinyl chloride (PVC).

In some aspects, the pneumatic tube is aluminum.
In some aspects, the pneumatic tube is above-ground.
In some aspects, the pneumatic tube is below-ground.
In some aspects, the compressed air pump is located at a commercial property.

In some aspects, the compressed air pump forms a partial vacuum in the pneumatic tube. The compressed air pump may advance the capsule by blowing air.

In some aspects, the plurality of exit ports includes a sensor configured to detect an arrival of the capsule at the personal residence.

In accordance with an aspect of the disclosure, a method of delivering a capsule through a pneumatic delivery system includes positioning a package receptacle in the capsule. The capsule is then positioned in a pneumatic tube. The pneumatic tube includes a plurality of entry ports and a plurality of exit ports. Each of the plurality of entry ports are configured to receive the capsule for transport. Each of the plurality of exit ports are configured for removal of the capsule from the pneumatic tube. At least one of the exit ports is located in a personal residence. A compressed air pump drives the capsule through the pneumatic tube to the personal residence using air. A capsule location system determines a position of the capsule with respect to the pneumatic tube. A sensor is positioned at a particular exit port located at the personal residence. The sensor detects an arrival of the capsule at a personal residence.

In some aspects, the pneumatic delivery system includes a network of pneumatic tubes connecting a commercial facility with a plurality of personal residences. Each personal residence includes a corresponding exit port configured to receive the capsule.

In some aspects, a pneumatic tube navigation system is configured to steer the capsule from the commercial facility to a particular residence.

In some aspects, the network of pneumatic tubes includes a plurality of geographic nodes. The pneumatic tube navigation system instructs the capsule to travel through a subset of pneumatic tubes in the network of pneumatic tubes along a predetermined sequence of the geographic nodes between the commercial facility and the particular residence.

BRIEF DESCRIPTION OF THE DRAWINGS

The accompanying drawings, which are incorporated in and constitute a part of this specification, illustrate aspects and features of the disclosure and, together with the detailed description below, serve to further explain the disclosure, in which:

FIG. 1 illustrates a capsule (FIG. 1A), a package receptacle (FIG. 1B) and a capsule including a package receptacle (FIG. 1C), in accordance with the present disclosure;

DETAILED DESCRIPTION

Descriptions of technical features or aspects of an exemplary embodiment of the disclosure should typically be considered as available and applicable to other similar features or aspects in another exemplary embodiment of the disclosure. Accordingly, technical features described herein according to one exemplary embodiment of the disclosure may be applicable to other exemplary embodiments of the disclosure, and thus duplicative descriptions may be omitted herein.

The terms "commercial property" and "commercial facility" may be used interchangeably herein.

Exemplary embodiments of the disclosure will be described more fully below (e.g., with reference to the accompanying drawings). Like reference numerals may refer to like elements throughout the specification and drawings.

Figure 1A:
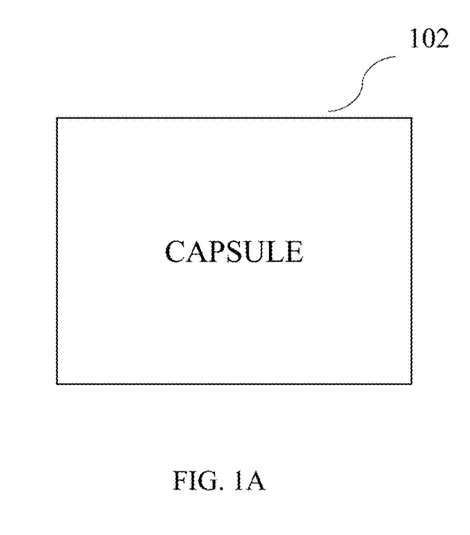
Figure 1B:
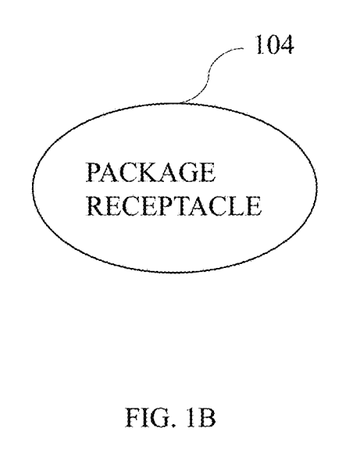
Figure 1C:
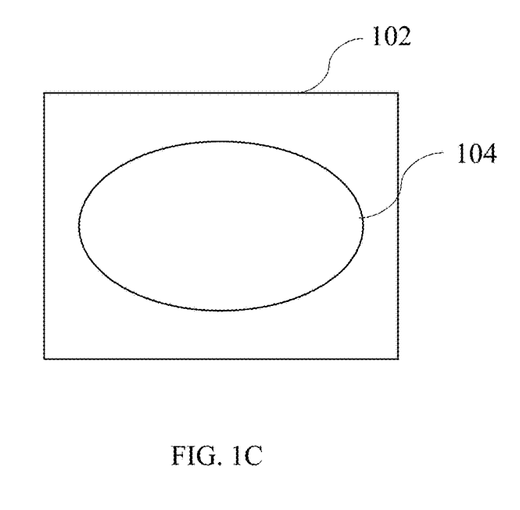

Referring to FIG. 1, a capsule 102 is shown at FIG. 1A. A package receptacle 104 is shown at FIG. 1B. A capsule 102 including a package receptacle 104 is shown at FIG. 1C.

In accordance with some embodiments, a capsule 102 may reduce waste of tape or other packaging material. Further, a capsule 102 may be cleaned, disinfected, and subsequently re-used. A package receptacle 104 may include letters, packages, or goods of any sort.

In accordance with some embodiments, the capsule 102 is waterproof. The capsule 102 may include carbon fiber or plastic. This may maximize durability, while minimizing weight.

Figure 2:
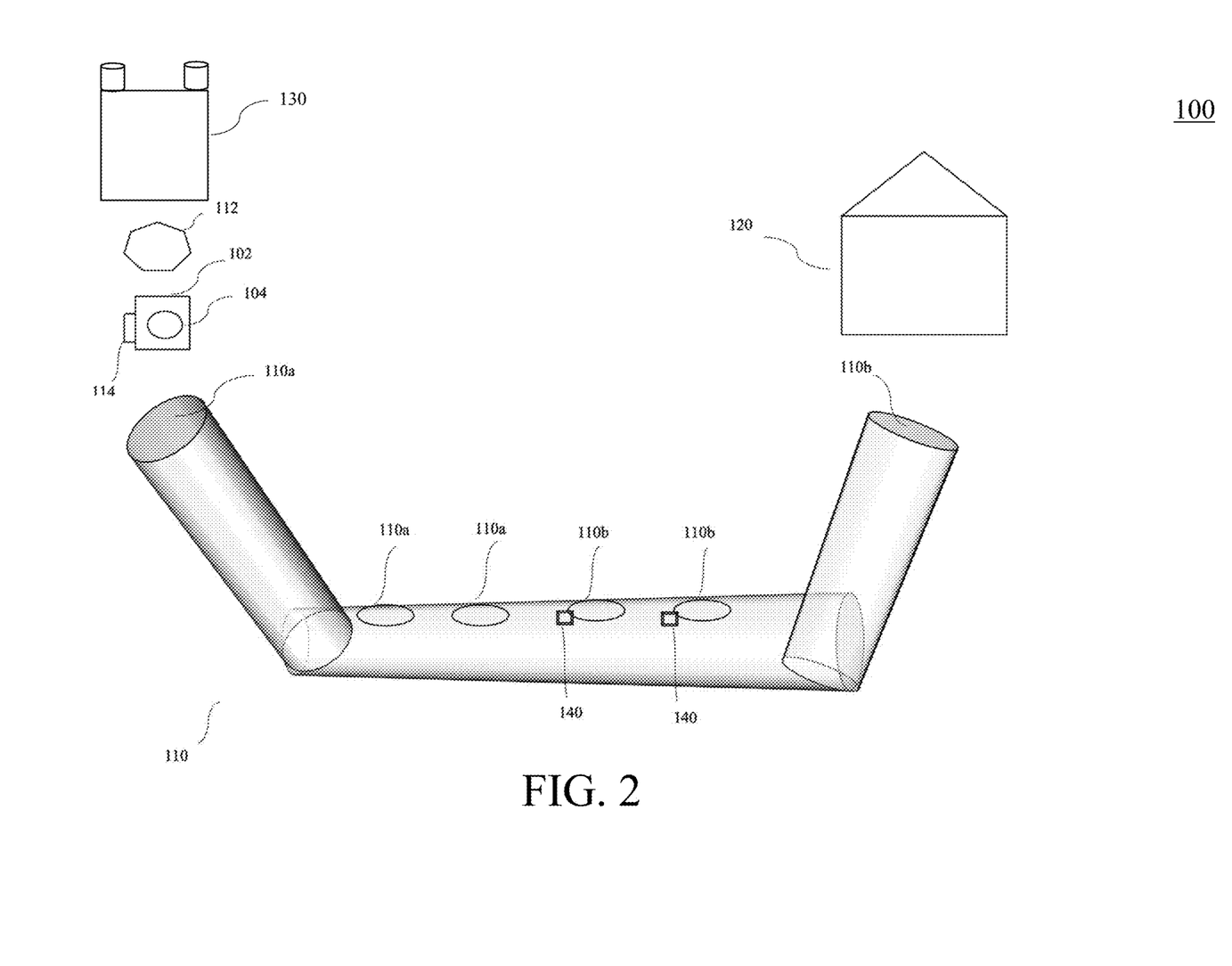
FIG. 2 is a pneumatic delivery system, in accordance with the present disclosure.

Referring to FIG. 2, a pneumatic delivery system 100 includes a capsule 102 to be transported within a pneumatic tube 110. As a result, theft or damage to a delivered package receptacle 104 (e.g., as a result of exposure to the elements) may be prevented, thus preventing a financial loss resulting from lost, stolen or damaged package receptacles 104 or capsules 102. The pneumatic tube 110 includes a plurality of entry ports 110a and a plurality of exit ports 110b.

In some aspects, a pneumatic delivery system 100 using a pneumatic tube 110 may include more rapid delivery or return of capsules 102.

In some aspects, the pneumatic tube 110 may include a track positioned therein to slidingly move the capsule 102 such that the capsule 102 will fit tightly within the pneumatic tube 110. A track positioned in the pneumatic tube 110 may include safe transportation of capsules 102 and package receptacles 104.

According to an exemplary embodiment, each of the plurality of entry ports 110a are configured to receive the capsule 102 for transport. Each of the plurality of exit ports 110b are configured for removal of the capsule 102 from the pneumatic tube 110. At least one of the exit ports 110b is located in a personal residence 120.

According to an exemplary embodiment, at least one of the entry ports 110a and at least one of the exit ports 110b may be located in a personal residence 120. For example, a resident may construct an entry port 110a or exit port 110b within the personal residence 120 or on personal residence 120 property.

According to an exemplary embodiment, a compressed air pump 112 is configured to advance the capsule 102 through the pneumatic tube 110.

In some aspects, a capsule location system 114 is configured for determining a location of the capsule 102 with respect to the pneumatic tube 110. Further, the capsule location system 114 may allow for programmable routing directions. The capsule location system 114 may be affixed to the capsule 102.

For example, the capsule location system 114 may include satellite orbit calculations and satellite selection, atmospheric delay correction calculations, navigation solution computation of output information, and preprocessing and coordinate conversion of aiding information. A GPS system may detect a location of a positioning beacon positioned about the capsule 102 to determine a location of the capsule 102 within the pneumatic tube delivery system 100.

According to an exemplary embodiment, a capsule location system 114 may include a scanning module positioned outside of the pneumatic tube 110 and detects the location of the capsule 102 within the pneumatic tube 110.

In some aspects, the capsule location system 114 may notify the recipient of the capsule 102 of the location of the capsule 102 in real-time. The capsule location system 114 may notify the commercial facility 130 of the location of the capsule 102 in real-time. Further, the capsule location system 114 may notify the recipient of the location of the capsule 102. The capsule location system 114 may notify the commercial facility 130 of the location of the capsule 102 throughout the transport of the capsule 102. As an example, the capsule location system 114 may provide a low-cost tracking system of tracking the capsule 102.

In some aspects, the pneumatic tube 110 includes Polyvinyl chloride (PVC). Alternatively, the pneumatic tube 110 includes aluminum.

In some aspects, the pneumatic tube 110 is above-ground. The pneumatic tube 110 may be below-ground. For example, portions of the pneumatic tube 110 may be above-ground and while portions of the pneumatic tube 110 are below-ground.

Each of the plurality of exit ports 110b includes a sensor 140 configured to detect an arrival of the capsule 102 at the personal residence 120. For example, the sensor 140 may notify the recipient of the capsule 102 of an arrival of the capsule 102. The sensor 140 may notify the commercial facility 130 of an arrival of the capsule 102.

Figure 3:
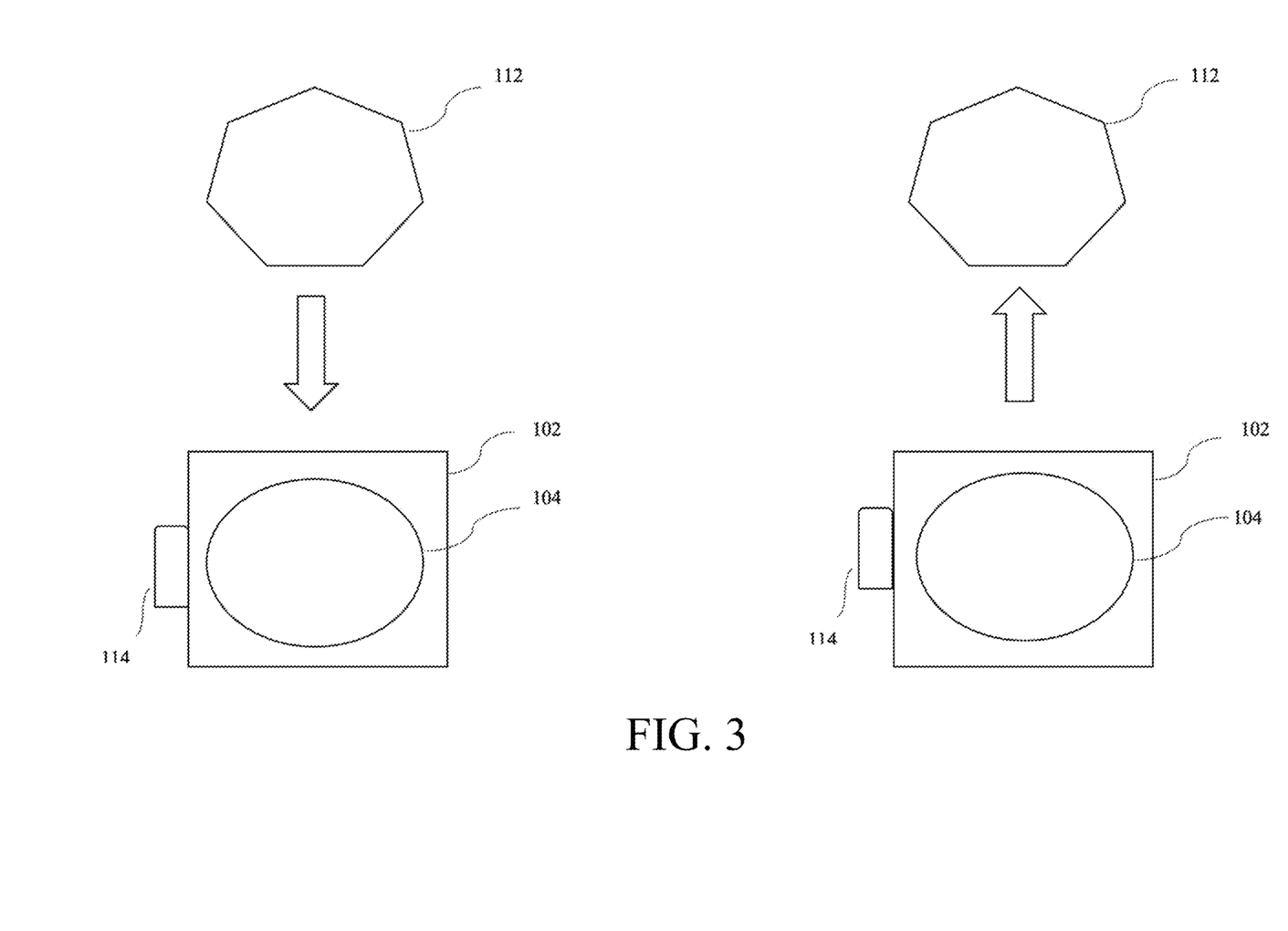
FIG. 3 illustrates a compressed air pump configured to advance the capsule by blowing air and a compressed air pump forming a partial vacuum, in accordance with the present disclosure.

FIG. 3 illustrates a compressed air pump 112 configured to advance the capsule 102 by blowing air. Further, a compressed air pump 112 may form a partial vacuum. The compressed air pump 112 may be located at a commercial property 130. The compressed air pump 112 may be located at a personal residence 120.

As an example, a compressed air pump 112 may be located at a personal residence 120 and a compressed air pump may be located at a commercial facility 130.

Figure 4:
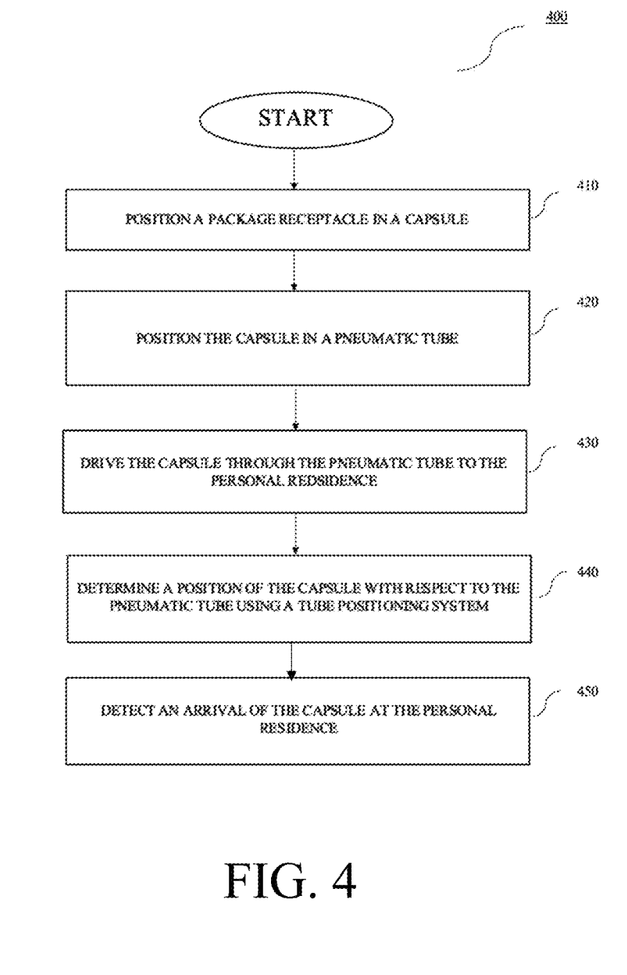
FIG. 4 is a flow chart of the method of delivering a capsule through a pneumatic delivery system, in accordance with the present disclosure.

FIG. 4 is a flow chart of the method 400 of delivering a capsule 202 through a pneumatic delivery system 200. At step 410, the method 400 of delivering a capsule 202 through a pneumatic delivery system 200 includes positioning a package receptacle 204 in the capsule 202.

At step 420, the method 400 of delivering a capsule 202 through a pneumatic delivery system 200 includes positioning the capsule 202 in a pneumatic tube 210.

In some aspects, the pneumatic tube 210 may include a track positioned therein to slidingly move the capsule 202 such that the capsule 202 will fit tightly within the pneumatic tube 210. A track positioned in the pneumatic tube 210 may include safe transportation of capsules 202 and package receptacles 204.

According to an exemplary embodiment, the pneumatic tube 210 includes a plurality of entry ports 210a and a plurality of exit ports 210b. Each of the plurality of entry ports 210a are configured to receive the capsule 202 for transport. Each of the plurality of exit ports 210b are configured for removal of the capsule 202 from the pneumatic tube 210. At least one of the exit ports 210b is located in a personal residence 220.

According to an exemplary embodiment, at least one of the entry ports 210a and at least one of the exit ports 210b may be located in a personal residence 220. For example, a resident may construct an entry port 210a or exit port 210b within the personal residence 220 or on personal residence 220 property.

At step 430, the method 400 of delivering a capsule 202 through a pneumatic delivery system 200 includes driving the capsule 202 through the pneumatic tube 210 to the personal residence 220 using air generated by a compressed air pump 212.

At step 430, the method 400 of delivering a capsule 202 through a pneumatic delivery system 200 includes determining a position of the capsule 202 with respect to the pneumatic tube 210 using a capsule location system 114.

Figure 5:
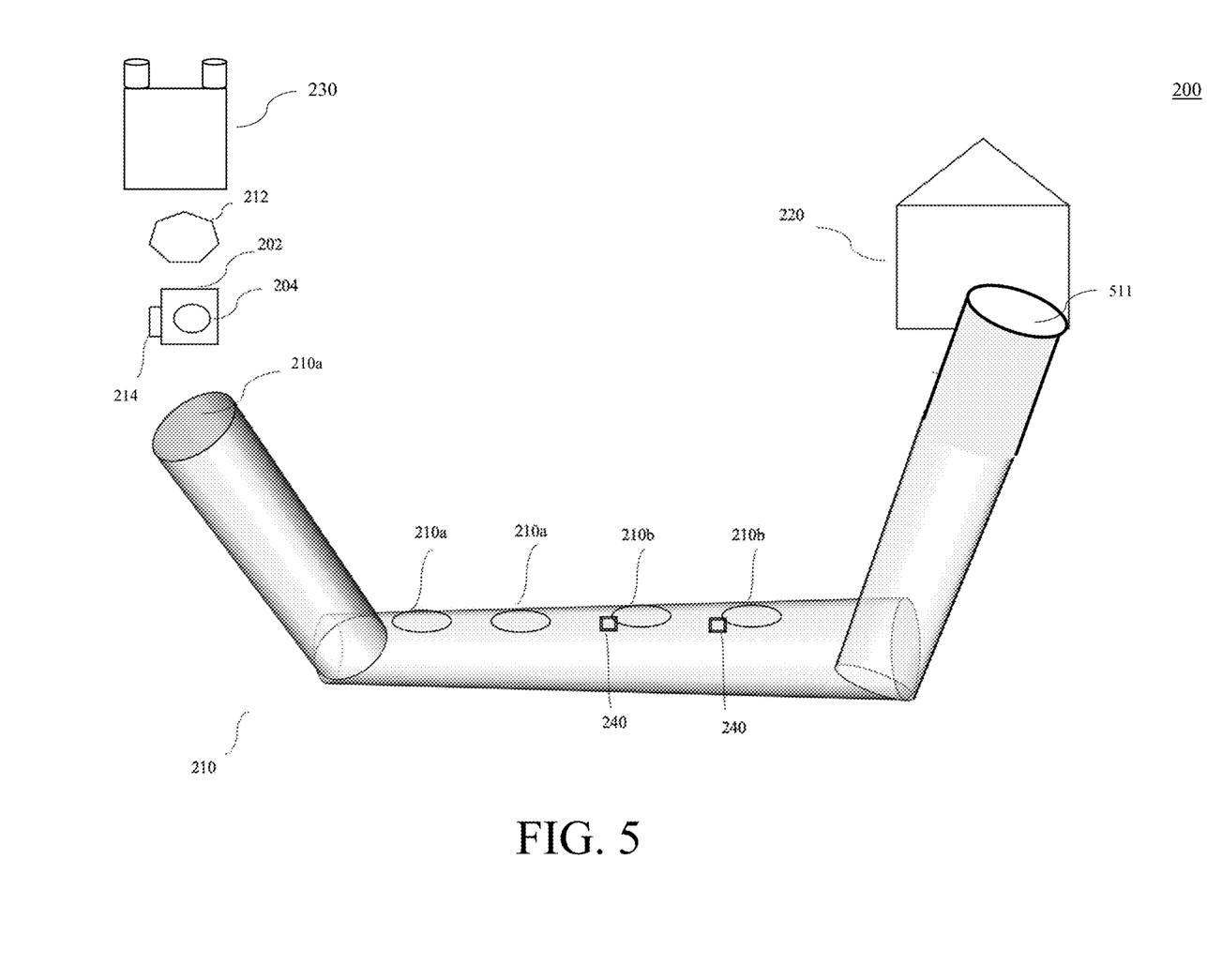
FIG. 5 is an exemplary pneumatic delivery system in which a particular exit port is located at a personal residence, in accordance with the present disclosure.

At step 450, the method 400 of delivering a capsule 202 through a pneumatic delivery system 200 includes detecting an arrival of the capsule 202 at the personal residence 220 by a sensor 240 positioned at a particular exit port 511 of the plurality of exit ports 210b, the particular exit port 511 being located at the personal residence 220. For example, the sensor 240 may notify the recipient of the capsule 202 of an arrival of the capsule 202. The sensor 240 may notify the commercial facility 230 of an arrival of the capsule 202.

Figure 6:
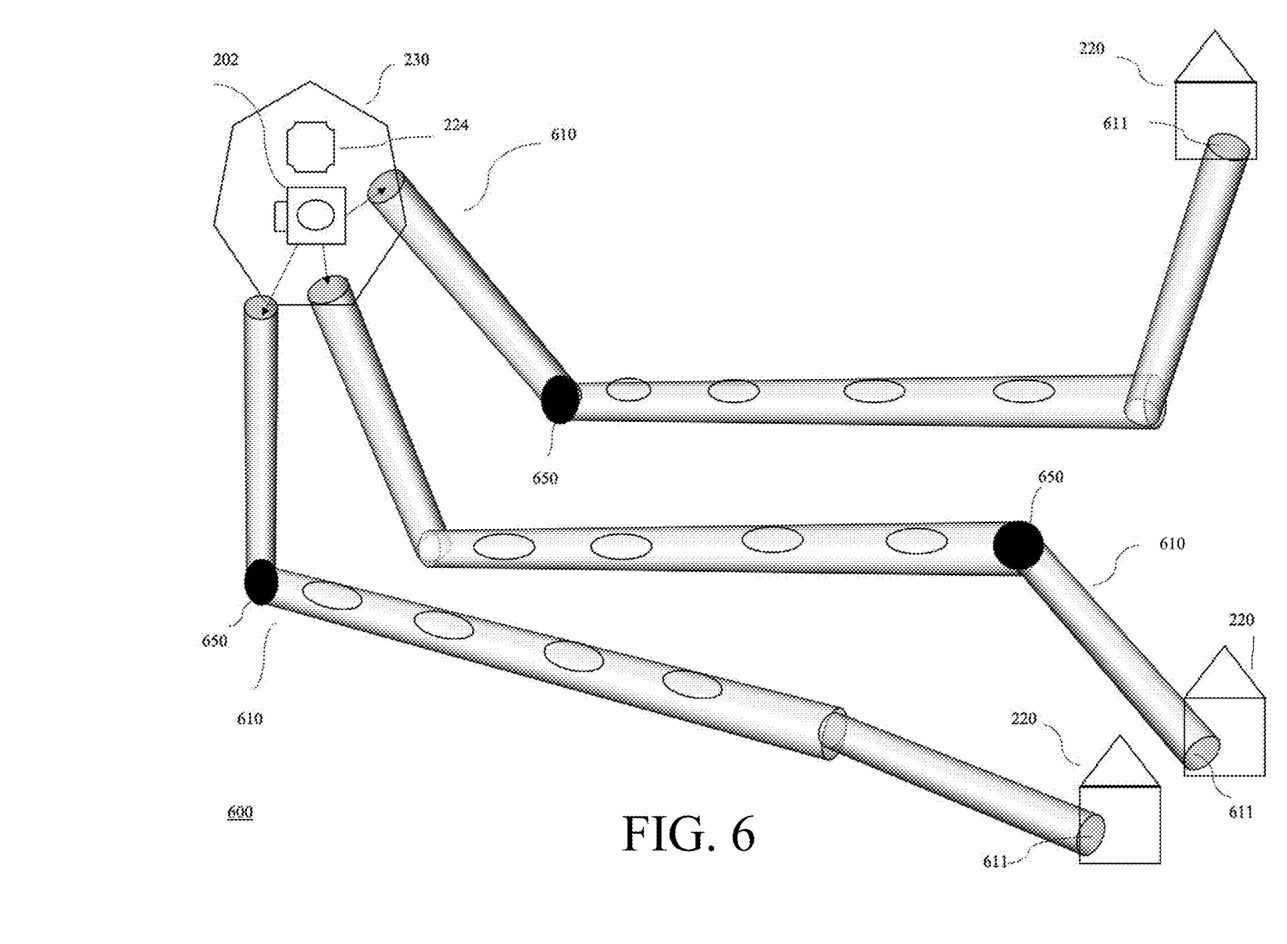
FIG. 6 is a pneumatic delivery system with a network of pneumatic tubes, in accordance with the present disclosure.

FIG. 6 is a pneumatic delivery system 200 with a network 600 of pneumatic tubes 610 connecting a commercial facility 230 with a plurality of personal residences 220, each of the plurality of personal residences 220 including a corresponding exit port 611 configured to receive the capsule 202. For example, a network 600 of pneumatic tubes 610 may be built in specific geographic regions to transport capsules 202 to many different locations. Further, a network 600 of pneumatic tubes 610 may have sub-networks in which capsules 202 may be transported to multiple different personal residences 220.

In some aspects, a network 600 of pneumatic tubes 610 may include pneumatic tubes 610 that are above-ground and pneumatic tubes 610 that are below-ground. For example, portions of the pneumatic tube 610 may be above-ground and while portions of the pneumatic tube 610 are below-ground.

According to an exemplary embodiment, the corresponding exit port 611 may be constructed by a resident within the personal residence 220 or on personal residence 220 property. Further, a resident may construct an entry port 210a or an exit port 210b within the personal residence 220 or on personal residence 220 property.

According to an exemplary embodiment, a pneumatic delivery system 200 and a pneumatic delivery system 200 with a network 600 of pneumatic tubes 610 may include a pneumatic tube navigation system 224.

According to an exemplary embodiment, a pneumatic tube navigation system 224 may include a scanning module positioned outside of the pneumatic tube 610 and detects the location of the capsule 202 within the pneumatic tube 610.

In some aspects, the pneumatic tube navigation system 224 may be configured to steer the capsule 202 from the commercial facility 230 to a particular residence 220 of the plurality of residences 220. The pneumatic tube navigation system 224 may be configured to steer the capsule 202 from a particular residence 220 of the plurality of residences 220 to a commercial facility 230 or to a plurality of residences 220.

According to an exemplary embodiment, the network 600 of pneumatic tubes 610 includes a plurality of geographic nodes 650. The plurality of geographic nodes 650 may include a plurality of sensors 240 affixed to the plurality of geographic nodes 650.

In some aspects, the pneumatic tube navigation system 224 instructs the capsule 202 to travel through a subset of pneumatic tubes 610 in the network 600 of pneumatic tubes 610 along a predetermined sequence 630 of the geographic nodes 650 between the commercial facility 230 and the particular residence 220 of the plurality of residences 220.

According to an exemplary embodiment, the predetermined sequence 630 of the geographic nodes 650 may notify the residence 220 of the position of the capsule 202. Further, the predetermined sequence 630 of the geographic nodes 650 may notify the commercial facility 230 of the position of the capsule 202.

From the foregoing and with reference to the various figure drawings, those skilled in the art will appreciate that certain modifications can also be made to the disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A pneumatic delivery system, comprising:
a capsule, the capsule including a package receptacle;
a plurality of pneumatic tubes, wherein the pneumatic tubes of the plurality of pneumatic tubes include a plurality of entry ports and a plurality of exit ports, each of the plurality of entry ports configured to receive the capsule for transport, and each of the plurality of exit ports configured for removal of the capsule from the pneumatic tubes, wherein at least one of the exit ports is located in a personal residence;
a compressed air pump, the compressed air pump configured to advance the capsule through the pneumatic tubes of the plurality of pneumatic tubes; and
a capsule location system, the capsule location system configured to determine a location of the capsule and the package receptable with respect to the plurality of pneumatic tubes,
wherein the capsule location system includes a plurality of geographic nodes arranged throughout the plurality of pneumatic tubes, wherein the capsule location system is configured to steer the capsule to the personal residence along a subset of pneumatic tubes of the plurality of pneumatic tubes by traveling along a sequence of a subset of geographic nodes of the plurality of geographic nodes, wherein the capsule location system is configured to communicate the location of the capsule and the package receptacle to the personal residence with respect to the sequence of the subset of geographic nodes of the plurality of geographic nodes.

2. The delivery system of claim 1, wherein the capsule is waterproof.

3. The delivery system of claim 1, wherein the capsule includes carbon fiber or plastic.

4. The delivery system of claim 1, wherein the pneumatic tube includes Polyvinyl chloride (PVC).

5. The delivery system of claim 1, wherein the pneumatic tube includes aluminum.

6. The delivery system of claim 1, wherein the pneumatic tube is above-ground.

7. The delivery system of claim 1, wherein the pneumatic tube is below-ground.

8. The delivery system of claim 1, wherein the compressed air pump is located at a commercial property.

9. The delivery system of claim 1, wherein the compressed air pump forms a partial vacuum in the pneumatic tube.

10. The delivery system of claim 1, wherein the compressed air pump advances the capsule by blowing air.

11. The delivery system of claim 1, wherein each of the plurality of exit ports includes a sensor configured to detect an arrival of the capsule at the personal residence.

12. A method of delivering a capsule through a pneumatic delivery system, comprising:
- positioning a package receptacle in the capsule;
- positioning the capsule in a pneumatic tube of a plurality of pneumatic tubes, the pneumatic tube including a plurality of entry ports and a plurality of exit ports, each of the plurality of entry ports configured to receive the capsule for transport, and each of the plurality of exit ports configured for removal of the capsule from the pneumatic tube, wherein at least one of the exit ports is located in a personal residence;
- determining a position of the capsule with respect to the pneumatic tube using a capsule location system, wherein the capsule location system includes a plurality of geographic nodes arranged throughout the plurality of pneumatic tubes, wherein the capsule location system is configured to steer the capsule to the personal residence along a subset of pneumatic tubes of the plurality of pneumatic tubes by traveling along a sequence of a subset of geographic nodes of the plurality of geographic nodes;
- driving the capsule to the personal residence through the subset of pneumatic tubes of the plurality of pneumatic tubes along the sequence of the subset of geographic nodes of the plurality of geographic nodes;
- communicating, to the personal residence, the location of the capsule and the package receptacle with respect to the sequence of the subset of geographic nodes of the plurality of geographic nodes; and
- detecting an arrival of the capsule and the package receptacle at the personal residence by a sensor positioned at a particular exit port of the plurality of exit ports, the particular exit port being located at the personal residence.

13. The method of claim 12, wherein the plurality of pneumatic tubes connect a commercial facility with a plurality of personal residences, each of the plurality of personal residences including a corresponding exit port configured to receive the capsule.

* * * * *